US007947238B2

(12) United States Patent
Deeba

(10) Patent No.: US 7,947,238 B2
(45) Date of Patent: May 24, 2011

(54) OXIDATION CATALYST WITH LOW CO AND HC LIGHT-OFF AND SYSTEMS AND METHODS

(75) Inventor: Michel Deeba, East Brunswick, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/643,614

(22) Filed: Dec. 21, 2009

(65) Prior Publication Data
US 2010/0166629 A1 Jul. 1, 2010

Related U.S. Application Data

(60) Provisional application No. 61/141,100, filed on Dec. 29, 2008.

(51) Int. Cl.
B01D 53/94 (2006.01)
B01J 23/44 (2006.01)

(52) U.S. Cl. ........... 423/213.2; 423/213.5; 423/213.7; 60/299; 502/304; 502/349; 502/355; 502/325; 502/339

(58) Field of Classification Search ............... 423/213.2, 423/213.5, 213.7; 60/299; 502/304, 349, 502/355, 325, 339
See application file for complete search history.

(56) References Cited

U.S. PATENT DOCUMENTS

| 4,329,162 | A | 5/1982 | Pitcher, Jr. |
| 4,335,023 | A | 6/1982 | Dettling et al. |
| 4,961,917 | A | 10/1990 | Byrne |
| 5,490,977 | A | 2/1996 | Wan et al. |
| 5,516,497 | A | 5/1996 | Speronello et al. |
| 5,531,972 | A | 7/1996 | Rudy |
| 6,171,556 | B1 | 1/2001 | Burk et al. |
| 2003/0061860 | A1 | 4/2003 | Hu et al. |
| 2008/0219906 | A1 | 9/2008 | Chen et al. |
| 2010/0135879 | A1* | 6/2010 | Roesch et al. ............ 423/213.5 |
| 2010/0263357 | A1* | 10/2010 | Lindner et al. ............ 60/299 |

OTHER PUBLICATIONS

PCT International Search Report; dated Jul. 20, 2010.

* cited by examiner

Primary Examiner — Timothy C Vanoy
(74) Attorney, Agent, or Firm — Scott Servilla; Diehl Servilla LLC; Melanie Brown

(57) ABSTRACT

An oxidation catalyst for the treatment of exhaust gas emissions, such as the oxidation of unburned hydrocarbons (HC), and carbon monoxide (CO) and the reduction of nitrogen oxides (NOx) from a diesel engine and methods of exhaust gas treatment are disclosed. More particularly, a washcoat composition is disclosed comprising at least two washcoat layers, a first washcoat comprising palladium supported on ceria-zirconia and ceria-zirconia-alumina and a second washcoat containing one or more of platinum and palladium and one or more hydrocarbon storage components. An undercoat may also be included in the catalyst. Also disclosed are method of exhaust gas treatment and diesel exhaust gas treatment systems that include the oxidation catalyst and a downstream soot filter.

26 Claims, 4 Drawing Sheets

OXIDATION CATALYST WITH LOW CO AND HC LIGHT-OFF AND SYSTEMS AND METHODS

CROSS-REFERENCE TO RELATED APPLICATIONS

This application claims the benefit of priority under 35 U.S.C. §119(e) to U.S. Provisional Application Ser. No. 61/141,100, filed Dec. 29, 2008, which is incorporated herein by reference.

TECHNICAL FIELD

The present invention are directed to an oxidation catalyst with low carbon monoxide (CO)/hydrocarbon (HC) light-off and methods of treating exhaust gas streams containing HC/CO. More specifically, the present invention is directed to a catalyst composition comprising at least two layers, and systems and methods utilizing such catalyst compositions.

BACKGROUND

Operation of lean burn engines, e.g., diesel engines and lean burn gasoline engines, provide the user with excellent fuel economy and have very low emissions of gas phase hydrocarbons and carbon monoxide due to their operation at high air/fuel ratios under fuel lean conditions. Diesel engines, in particular, also offer significant advantages over gasoline engines in terms of their durability and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others. NO is of concern because it is believed to undergo a process known as photo-chemical smog formation, through a series of reactions in the presence of sunlight and hydrocarbons, and is significant contributor to acid rain. $NO_2$ on the other hand has a high potential as an oxidant and is a strong lung irritant. Particulates (PM) are also connected to respiratory problems. As engine operation modifications are made to reduce particulates and unburned hydrocarbons on diesel engines, the $NO_2$ emissions tend to increase.

The two major components of particulate matter are the volatile organic fraction (VOF) and a soot fraction (soot). The VOF condenses on the soot in layers, and is derived from the diesel fuel and oil. The VOF can exist in diesel exhaust either as a vapor or as an aerosol (fine droplets of liquid condensate) depending on the temperature of the exhaust gas. Soot is predominately composed of particles of carbon. The particulate matter from diesel exhaust is highly respirable due to its fine particle size, which poses health risks at higher exposure levels. Moreover, the VOF contains polycyclic aromatic hydrocarbons, some of which are suspected carcinogens.

A filter known in the art for trapping particulate matter is a wall-flow filter. Such wall-flow filters can comprise catalysts on the filter and burn off filtered particulate matter. A common construction is a multi-channel honeycomb structure having the ends of alternate channels on the upstream and downstream sides of the honeycomb structure plugged. This results in checkerboard type pattern on either end. Channels plugged on the upstream or inlet end are opened on the downstream or outlet end. This permits the gas to enter the open upstream channels, flow through the porous walls and exit through the channels having open downstream ends. The gas to be treated passes into the catalytic structure through the open upstream end of a channel and is prevented from exiting by the plugged downstream end of the same channel. The gas pressure forces the gas through the porous structural walls into channels closed at the upstream end and opened at the downstream end. Such structures are primarily known to filter particles out of the exhaust gas stream. Often, the structures have catalysts on the substrate, which enhance the oxidation of the particles. Oxidation catalysts comprising a precious metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters or catalyzers, which are placed in the exhaust flow path from diesel power systems to treat the exhaust before it vents to the atmosphere. Typically, the diesel oxidation catalysts are formed on ceramic or metallic substrate carriers (such as the flow-through monolith carrier, as described hereinbelow) upon which one or more catalyst coating compositions are deposited. In addition to the conversions of gaseous HC, CO and particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. Oxidation catalysts comprising a platinum group metal dispersed on a refractory metal oxide support are known for use in treating exhaust gas emissions from diesel engines. Platinum (Pt) is an effective platinum group metal for oxidizing CO and HC in a DOC, after high temperature aging under lean conditions and in the presence of fuel sulfur. Despite the lower cost of Pd compared to Pt, Pd-based DOCs catalyst typically show higher light-off temperatures for oxidation of CO and HC, especially when used with HC storage materials, potentially causing a delay in HC and or CO light-off. "Light-off" temperature for a specific component is the temperature at which 50% of that component reacts. Pd-containing DOCs may poison the activity of Pt to convert paraffins and/or oxidize NOx and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions.

The present invention provides a washcoat design in order that addresses at least one of the above problems.

SUMMARY

One aspect present invention is directed to a diesel oxidation catalyst for the treatment of exhaust gas emissions, such as the oxidation of unburned hydrocarbons (HC), and carbon monoxide (CO). More particularly, the present invention is directed to a catalyst that utilizes a washcoat composition comprising at least two washcoat layers.

According to a first embodiment, an oxidation catalyst for abatement of exhaust gas emissions from an engine comprises a carrier substrate; an undercoat coated on the carrier substrate, the undercoat comprising a refractory metal oxide support; and a first washcoat layer comprising a support material selected from ceria-zirconia and ceria-zirconia-alumina and a precious metal catalyst containing palladium (Pd), wherein said first washcoat layer does not contain a zeolite.

In one or more embodiments, the refractory metal oxide comprises alumina, ceria, zirconia, ceria-alumina, ceria-zirconia, ceria-zirconia-alumina, and mixtures thereof. The refractory metal oxide further can further comprise one or more promoters selected from oxides of lanthanum, yttrium, neodymium, praseodymium, samarium, and strontium. In one embodiment, the Pd is present in an amount less than about 75 g/ft$^3$.

According to certain embodiments, the undercoat further comprises a hydrocarbon storage component comprising a molecular sieve. Suitable molecular sieves can be selected from a beta zeolite, a molecular sieve having the CHA structure, X zeolite, Y zeolite, silicoaluminophosphates, and pentasil. In at least one embodiment, the first washcoat layer contains substantially no platinum.

According to one or more embodiments, the oxidation catalyst includes a second washcoat layer coated over said first washcoat layer comprising a support material, and a precious metal catalyst containing one or more of platinum (Pt) and palladium (Pd), and at least one of the undercoat or the second washcoat layer comprises one or more hydrocarbon storage components. In one or more embodiments that include a second washcoat layer, the undercoat comprises a hydrocarbon storage component comprising a molecular sieve. Examples of suitable molecular sieves include faujasite, chabazite, clinoptilolite, mordenite, silicalite, zeolite X, zeolite Y, ultrastable zeolite Y, ZSM zeolite, offretite, and beta zeolite.

According to one or more embodiments, the second washcoat layer contains platinum and palladium in a Pt:Pd ratio in the range of about 1:1 to 10:1.
In specific embodiments, the second washcoat layer contains platinum and palladium in a Pt:Pd ratio in the range of about 1:1 to 2:1. In other specific embodiments, the total precious metal loading in the first and second washcoat layers is equal to or less than about 90 g/ft$^3$.

In one or more embodiments that include a second washcoat layer, the first washcoat layer is substantially silica free. In one or more embodiments that include a second washcoat layer, one or more of the undercoat washcoat layer and second washcoat layer further comprises a ceria-zirconia material.

According to one or more embodiments that include a second washcoat layer, wherein the second washcoat layer comprises a molecular sieve. The molecular sieve can comprise any suitable molecular sieve material, and in a specific embodiment, the molecular sieve comprises beta zeolite. In one or more embodiments, the second washcoat layer comprises one or more of alumina and silica-alumina.

The substrate for the oxidation catalysts described above may comprise a honeycomb substrate comprising substantially parallel gas flow passages extending from an inlet or an outlet face of the substrate defined by walls on which the washcoat layers are coated so that gases flowing through the passages contact material contained in the layers.

In another aspect, the present invention is directed to a method of treating an exhaust gas stream by contacting the exhaust gas stream with a diesel oxidation catalyst containing a washcoat composition comprising at least two washcoat layers. In one embodiment, a method for treating a diesel exhaust gas stream comprises contacting the exhaust gas stream with a top layer catalyst coated over a first catalyst layer, the top layer catalyst comprising a support material, one or more hydrocarbon storage components, and a precious metal catalyst containing one or more of platinum (Pt) and palladium (Pd); and after contacting the exhaust gas stream with the top layer catalyst, contacting the exhaust gas stream with a first catalyst layer comprising a support material selected from ceria-zirconia and ceria-zirconia-alumina and a precious metal catalyst containing palladium (Pd) and substantially no platinum, wherein said first washcoat layer does not contain a zeolite.

In one or more embodiments, the hydrocarbon storage component comprises a zeolite, for example, faujasite, chabazite, clinoptilolite, mordenite, silicalite, zeolite X, zeolite Y, ultrastable zeolite Y, ZSM zeolite, offretite, and beta zeolite. In one embodiment, the top washcoat layer contains platinum and palladium in a Pt:Pd ratio in the range of about 1:1 to 2:1. According to one embodiment, the total precious metal loading in the first and top washcoat layers is equal to or less than about 90 g/ft$^3$.

In one embodiment, the diesel exhaust gas stream subsequent to contacting said diesel oxidation catalyst is directed to a catalyzed soot filter (CSF) located downstream of said diesel oxidation catalyst. In one embodiment, the diesel exhaust gas stream, subsequent to contacting said catalyzed soot filter (CSF) is directed to a selective catalytic reduction (SCR) component located downstream of said catalyzed soot filter (CSF).

Another aspect of the invention pertains to a diesel exhaust gas system that include diesel oxidation catalysts of the type described herein. In one embodiment, such a system includes a diesel oxidation catalyst and a soot filter, for example, a catalyzed wall flow filter downstream from the diesel oxidation catalyst. The diesel oxidation catalyst may be placed in a close-coupled position.

DETAILED DESCRIPTION

Figure 1:
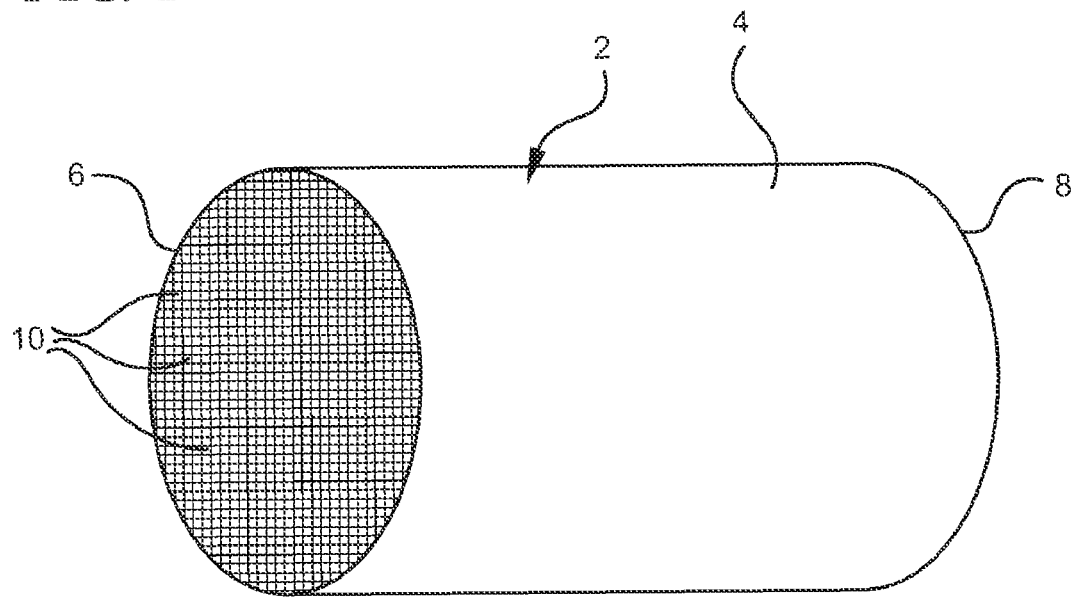
FIG. 1 is a perspective view of a honeycomb-type refractory carrier member which may comprise a novel diesel oxidation catalyst (DOC) washcoat composition in accordance with the present invention.

Before describing several exemplary embodiments of the invention, it is to be understood that the invention is not limited to the details of construction or process steps set forth in the following description. The invention is capable of other embodiments and of being practiced or being carried out in various ways.

One aspect of the present invention is directed to an oxidation catalyst (DOC) catalyst including washcoat composition comprising two washcoat layers. The washcoat composition according to embodiments of the present invention is optimized for lower HC/CO light off temperatures than conventional oxidation catalysts.

In a first embodiment, an oxidation catalyst for abatement of exhaust gas emissions from an engine comprises a carrier substrate; an undercoat coated on the carrier substrate, the undercoat comprising a refractory metal oxide support; and a first washcoat layer comprising a support material selected from ceria-zirconia and ceria-zirconia-alumina and a precious metal catalyst containing palladium (Pd) and substantially no platinum, wherein said first washcoat layer does not contain a zeolite. In a specific embodiment, the refractory metal oxide comprises alumina, ceria, zirconia, ceria-alumina, ceria-zirconia, alumina-ceria-zirconia and mixtures thereof. In a more specific embodiment, the Pd is present in an amount less than about 75 g/ft$^3$, for example, less than about 65 g/ft$^3$, and more particularly, less than about 60 g/ft$^3$.

In a second embodiment, in addition to an undercoat, and a first washcoat layer, a catalyst is provided which includes a second washcoat layer coated over said first washcoat layer comprising a support material, one or more hydrocarbon storage components, and a precious metal catalyst containing one or more of platinum (Pt) and palladium (Pd). In one embodiment, the hydrocarbon storage component in the undercoat and/or the second coat comprises a zeolite. Non-limiting examples of zeolites include faujasite, chabazite, clinoptilolite, mordenite, silicalite, zeolite X, zeolite Y, ultrastable zeolite Y, ZSM zeolite, offretite, and beta zeolite or combination thereof. In a highly specific embodiment, the zeolite comprises beta-zeolite. In other embodiments, the hydrocarbon storage component may comprise silicoaluminophosphates, aluminophosphates, and combinations thereof.

According to one or more embodiments, the under coat may contain a refractory oxide selected from alumina, ceria-zirconia, ceria-zirconia-alumina, and mixtures thereof. The first coat may comprise a palladium component and ceria-zirconia, ceria-zirconia-alumina, and combination thereof. The second coat may comprise a palladium component, alumina, ceria-zirconia, ceria-zirconia-alumina, silica-alumina (e.g., Siralox), and combinations thereof.

In specific embodiments that utilize ceria-zirconia-alumina, the ceria content is in the range of about 5-35% by weight, for example, 5%, 10%, 15%, 20%, 25%, 30, and 35%, and the zirconia content is in the range of 10-75%, for example 10%, 15,%, 20%, 25%, 30%, 35%, 40%, 45%, 50%, 55%, 60%, 65%, 70% and 75%, with the balance being alumina and promoters selected from one or more of oxides La, Y, Pr, ND, Sm. Ba, and Sr, with the promoter being present in a range of about 1-10%, for example 1%, 2,%, 3%, 4%, 5%, 6%, 7%, 8%, 9%, and 10%.

Specific zeolite adsorbent materials have a high silica to alumina ratio. The zeolites may have a silica/alumina molar ratio of from at least about 25/1, preferably at least about 100/1, with useful ranges of from about 25/1 to 1000/1, 50/1 to 500/1 as well as about 25/1 to 300/1, from about 100/1 to 250/1, or alternatively from about 35/1 to 180/1 is also exemplified. Specific zeolites include ZSM, Y and beta zeolites. A specific adsorbent may comprise a beta zeolite of the type disclosed in U.S. Pat. No. 6,171,556 incorporated herein by reference in its entirety. The zeolite loading should not be smaller than 0.3 g/in$^3$ in order to guarantee sufficient HC storage capacity and to prevent a premature release of stored paraffins, e.g., decane, during the temperature ramp following a low temperature storage. Preferably, zeolite content is in the range of 0.25-1.5 g/in$^3$.

In one embodiment, the one or more zeolites may be stabilized by ion exchange with a rare earth metal. In another embodiment, the washcoat layer(s) of the present invention may include one or more rare earth oxides (e.g., ceria) to promote the oxidation of heavy HCs.

In a specific embodiment, the second washcoat layer contains platinum and palladium in a Pt:Pd ratio in the range of about 1:1 to 10:1, for example in the range of about 1:1 and 2:1. In a specific embodiment, the total precious metal loading in the first and second washcoat layers is equal to or less than about 90 g/ft$^3$.

According to one or more embodiments, the substrate comprises a honeycomb substrate comprising substantially parallel gas flow passages extending from an inlet or an outlet face of the substrate defined by walls on which the washcoat layers are coated so that gases flowing through the passages contact material contained in the layers. Another aspect of the present invention pertains to a method for treating engine exhaust gas stream emissions containing unburned hydrocarbons (HC), carbon monoxides (CO), nitrous oxides (NOx) and/or particulate matter. In a particular embodiment, the engine is a diesel engine. An exhaust gas stream from a diesel engine can be treated in an emission treatment device containing the washcoat composition of the present invention. In accordance with and embodiment the present invention, the exhaust gas stream first comes into contact with the second or top washcoat layer and subsequently comes into contact with the first or bottom washcoat layer.

Preferably, the novel oxidation catalyst washcoat composition of the present invention is disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Examples of suitable substrates in clued flowthrough substrates, foam substrates and mesh substrates. One suitable substrate is a flowthrough carrier which can be metallic or a refractory ceramic and has a plurality of parallel exhaust flow passages extending therethrough and defined by passage walls on which the catalyst composition is coated. In other embodiments, the substrate can be a filter. Useful filters include wallflow filters; foam filters; wound fiber filters; ceramic fiber felt, knit or weave filters; and mesh filters.

Such monolithic carriers may contain up to about 900 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Flow-through substrates typically have a wall thickness between 0.002 and 0.1 inches. Preferred flow-through substrates have a wall thickness of between 0.002 and 0.015 inches.

The ceramic substrate may be made of any suitable refractory material, e.g., cordierite, cordierite-alumina, silicon carbide, aluminum titanate, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

The oxidation catalyst washcoat compositions of the present invention can be applied to the substrate surfaces by any known means in the art. For example, the catalyst washcoat can be applied by spray coating, powder coating, or brushing or dipping a surface into the catalyst composition.

The support used in the first or bottom washcoat layer is a substantially silica-free high-surface area support (e.g., alumina or blend of aluminas) in order to prevent silica poisoning of the Pd. As used herein, a "substantially silica-free high-surface area support" is a support material containing no more than 1.5 wt % silica or is completely free of silica. In one embodiment, the silica free high-surface area support is selected from the group including compounds of alumina, zirconia, ceria and mixtures thereof.

In one embodiment, the washcoat composition of the present invention comprises two distinct washcoat layers coated on a single substrate or carrier member, one layer (e.g., the first or top washcoat layer) over top of the other (e.g., the second or bottom washcoat layer). In this embodiment, the second or bottom washcoat layer is coated over the entire axial length of a substrate (e.g., a flow-through monolith) and the first or top washcoat layer is coated over the entire axial length of the second or bottom washcoat layer.

Figure 2:
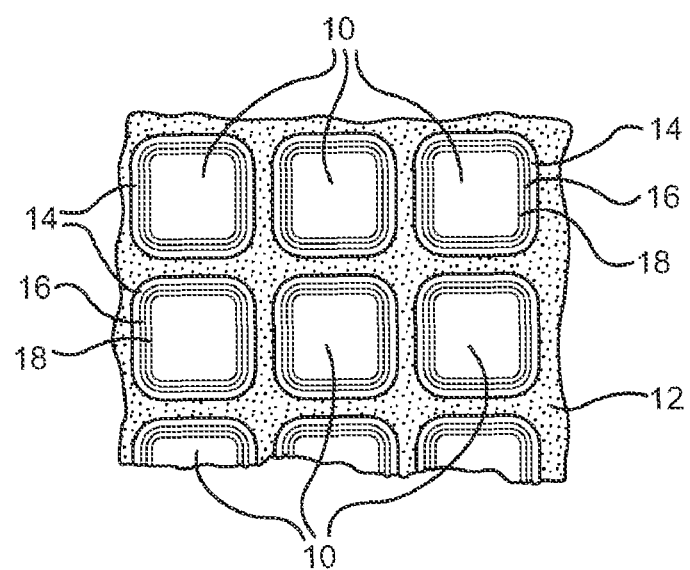
FIG. 2 is a partial cross-sectional view enlarged relative to FIG. 1 and taken along a plane parallel to the end faces of the carrier of FIG. 1, which shows an enlarged view of one of the gas flow passages shown in FIG. 1.

The catalyst according to one or more embodiments of the present invention may be more readily appreciated by reference to FIGS. 1 and 2. FIGS. 1 and 2 show a refractory carrier member 2, in accordance with one embodiment of present invention. Referring to FIG. 1, the refractory carrier member 2 is a cylindrical shape having a cylindrical outer surface 4, an upstream end face 6 and a downstream end face 8, which is identical to end face 6. Carrier member 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape, substantially square in the illustrated embodiment, but with rounded corners in accordance with U.S. Pat. No. 4,335,023, issued Jun. 15, 1982 to J. C. Dettling et al. A discrete undercoat layer 14, which in the art and sometimes below is referred to as a "washcoat", is adhered or coated onto the walls 12 of the carrier member. As shown in FIG. 2, a second discrete first washcoat layer 16 is coated over the undercoat washcoat layer 14 as described above. In one embodiment, a second or top washcoat layer 18 is coated over the first washcoat layer 16 as described above.

As shown in FIG. 2, the carrier member include void spaces provided by the gas-flow passages 10, and the cross-sectional area of these passages 10 and the thickness of the walls 12 defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("$g/in^3$") and grams per cubic foot ("$g/ft^3$") are used herein to mean the weight of a component per volume of the carrier member, including the volume of void spaces of the carrier member.

During operation, exhaust gaseous emissions from a lean burn engine comprising hydrocarbons, carbon monoxide, nitrogen oxides, and sulfur oxides initially encounter the second top washcoat layer 18 (when present), and thereafter encounter the first washcoat layer 16 and then the undercoat washcoat layer 14.

In another embodiment, the distinct washcoat layers of the present invention may be zone coated such that one washcoat layer is on the upstream end, and the other washcoat on the downstream end, of the carrier substrate. For example, an upstream washcoat layer can be coated over a portion of the upstream region of the substrate and a downstream washcoat layer can be coated over a downstream portion of the substrate. In this embodiment, the top washcoat layer of the present invention is coated over the upstream portion of the carrier substrate (i.e., the upstream washcoat layer) and the bottom washcoat layer is coated over a downstream portion of the carrier substrate (i.e., the downstream washcoat layer). The upstream washcoat layer comprises a composition as described above with respect to the second washcoat layer. The first or downstream washcoat layer comprises a composition as described above with respect to the first washcoat layer.

Figure 3:
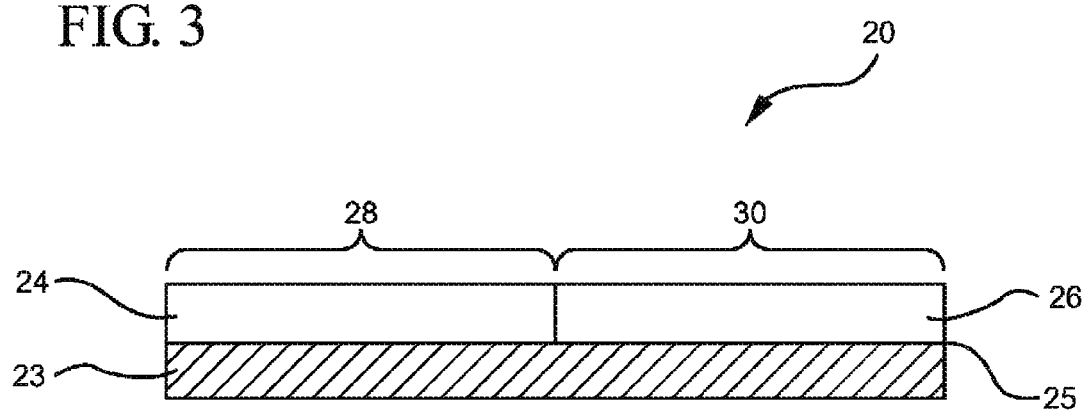
FIG. 3 is a schematic view showing an alternative configuration of diesel oxidation catalyst (DOC) washcoat composition, in accordance with one embodiment of the present invention.

The catalyst composition of this embodiment may be more easily understood by reference to FIG. 3. As shown in FIG. 3 an oxidation catalyst 20 is coated with a novel washcoat composition comprising a carrier member or substrate 22, for example a honeycomb monolith, which contains two separate zone coated washcoated layers, an upstream washcoat layer 24 and a downstream washcoat layer 26. The upstream layer 24 contains a support material, one or more hydrocarbon storage components (e.g. a zeolite), and a precious metal catalyst containing one or more of platinum (Pt) and palladium (Pd). In a particular embodiment, the upstream washcoat layer contains platinum and palladium in a Pt:Pd ratio in the range of about 1:1 to 10:1. The downstream washcoat layer 26 may contain a support material selected from ceria-zirconia and ceria-zirconia-alumina and a precious metal catalyst containing palladium (Pd) and substantially no platinum, wherein said downstream washcoat layer does not contain a zeolite.

In accordance with an embodiment of the present invention the upstream washcoat layer does not contain a silica support material, and does not contain a hydrocarbon storage component. Both the upstream washcoat layer 24 and downstream washcoat layer 26, together generally contain a total precious metal loading of less than about to 90 $g/ft^3$.

In this embodiment, the upstream 24 and downstream 26 washcoat layers, respectively, are each zone coated only over a portion of the substrate 22. However, the combination of the upstream 24 and downstream 26 washcoat layers, respectively, cover the entire length of the substrate 22. The upstream washcoat layer 24 can be coated over at least 0.5 inches, and up to 5 inches, of the upstream portion of the substrate 22. An upstream washcoat layer 24 having a length of at least about 1.0 inches, and up to 3.5 inches, or from at least 1.5 inches and up to 2.5 inches, from the upstream edge of the catalytic member, are also exemplified. With the downstream washcoat portion 26 covering the remaining downstream portion of the substrate 22.

The length of the upstream washcoat layer 24 can also be described as a percentage of the length of the catalytic member from the upstream to downstream edge. Typically, the upstream washcoat layer 24 will comprise from about 5 to about 70% of the upstream length of the catalytic member. Also exemplified is an upstream washcoat layer 24 of up to about 20%, up to about 40%, and up to about 60% of the upstream length of the diesel oxidation catalyst 20. With the downstream washcoat portion 26 covering the remaining downstream portion of the substrate 22. Thus, the downstream washcoat portion 26 may comprise 95 to about 30% of the downstream portion 30 of the substrate 22.

During operation, exhaust gases flow through the diesel oxidation catalyst 20 from the upstream edge 25 to the downstream edge 27. The precious metal catalysts contained in both the upstream 24 and downstream 26 washcoat layers, respectively, oxidize HC and CO pollutants contained in the exhaust gases.

The diesel oxidation catalyst (DOC) of the present invention can be used in an integrated emission treatment system comprising one or more additional components for the treatment of diesel exhaust gas emissions. For example, the emission treatment system may further comprise a soot filter component and/or a selective catalytic reduction (SCR) component. The diesel oxidation catalyst can be located upstream or downstream from the soot filter and/or selective catalytic reduction component.

In addition to treating the exhaust gas emissions via use of an oxidation catalyst the present invention may employ a soot filter for removal of particulate matter. The soot filter may be located upstream or downstream from the DOC, but is preferably located downstream from the diesel oxidation catalyst. In a preferred embodiment, the soot filter is a catalyzed soot filter (CSF). The CSF of the present invention comprises a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., a zirconia oxide) and/or an oxidation catalyst (e.g., a ceria-zirconia) for the combustion of unburned hydrocarbons and to some degree particulate matter. However, preferably the soot burning catalyst is an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Preferred wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite and silicon carbide. Such materials are able to withstand the environment, particularly high temperatures, encountered in treating the exhaust streams.

Preferred wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 50% (e.g., from 50 to 75%) having a mean pore size of at least 5 microns (e.g., from 5 to 30 microns). More preferably, the substrates have a porosity of at least 55% and have a mean pore size of at least 10 microns. When substrates with these porosities and these mean pore sizes are coated with the techniques described below, adequate levels of the CSF catalyst compositions can be loaded onto the substrates to achieve excellent NOx conversion efficiency and burning off of soot. These substrates are still able to retain adequate exhaust flow characteristics, i.e., acceptable back pressures, despite the CSF catalyst loading. U.S. Pat. No. 4,329,162 is herein incorporated by reference with respect to the disclosure of suitable wall flow substrates.

The porous wall flow filter used in this invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

The exhaust gas treatment system of the present invention may further comprise a selective catalytic reduction (SCR) component. The SCR component may be located upstream or downstream of the DOC and/or soot filter. Preferably, the SCR component is located downstream of a soot filter component. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

Figure 4:
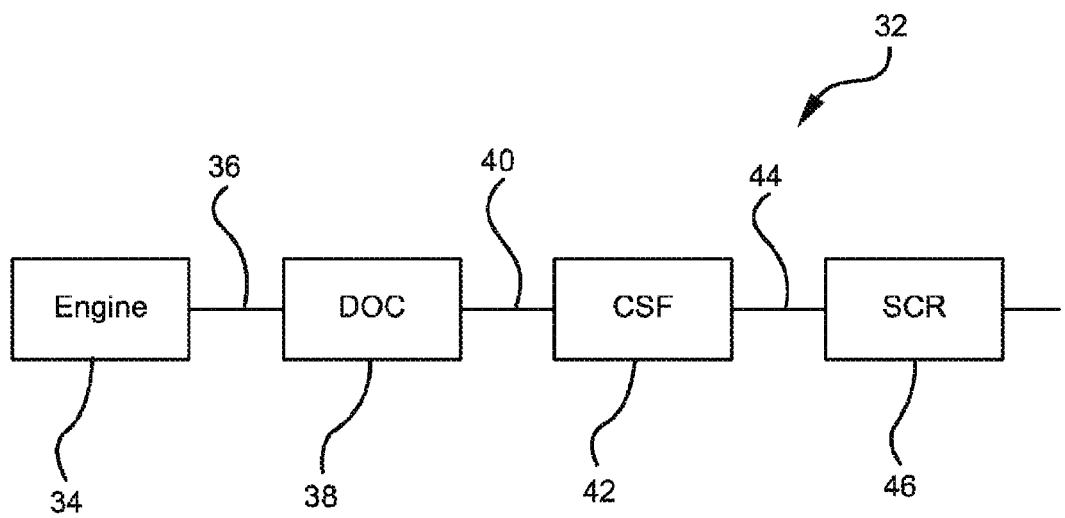
FIG. 4 is a schematic of an engine emission treatment system, in accordance with one embodiment of the present invention.

In one embodiment, the present invention is directed to an emission treatment system comprising one or more additional components for the treatment of diesel exhaust gas emissions. An exemplified emission treatment system may be more readily appreciated by reference to FIG. 4, which depicts a schematic representation of an emission treatment system 32, in accordance with this embodiment of the present invention. Referring to FIG. 4, an exhaust gas stream containing gaseous pollutants (e.g., unburned hydrocarbons, carbon monoxide and NOx) and particulate matter is conveyed via line 36 from an engine 34 to a diesel oxidation catalyst (DOC) 38, which is coated with the novel washcoat composition of the present invention. In the DOC 38, unburned gaseous and non-volatile hydrocarbons (i.e., the VOF) and carbon monoxide are largely combusted to form carbon dioxide and water. In addition, a proportion of the NO of the NOx component may be oxidized to $NO_2$ in the DOC. The exhaust stream is next conveyed via line 40 to a catalyzed soot filter (CSF) 42, which traps particulate matter present within the exhaust gas stream. The CSF 42 is optionally catalyzed for passive regeneration. After removal of particulate matter, via CSF 42, the exhaust gas stream is conveyed via line 44 to a downstream selective catalytic reduction (SCR) component 16 for the treatment and/or conversion of NOx. The DOC 38 may be placed in a close-coupled position.

The DOC catalyst compositions disclosed herein are useful as stable close-coupled catalysts. Close-coupled catalysts are placed close to an engine to enable them to reach reaction temperatures as soon as possible. In specific embodiments, the close-coupled catalyst is placed within three feet, more specifically, within one foot of the engine, and even more specifically, less than six inches from the engine. Close-coupled catalysts are often attached directly to the exhaust gas manifold. Due to their close proximity to the engine, close-coupled catalysts are preferably stable at high temperatures, e.g., up to 1100° C. during the operating life of the engine.

Specific embodiments according to the present invention will now be described in the following examples. The examples are illustrative only, and are not intended to limit the remainder of the disclosure in any way. Although the instant specification places emphasis on oxidation in a diesel engine, the oxidation catalysts described herein are useful for other catalytic reactions, such as oxidation of CO and hydrocarbons in gasoline engines.

EXAMPLES

Catalyst Preparation

Comparative Example 1

Reference Catalyst R

The reference catalyst R was made of two layers, bottom layer without precious metal and top layer where all precious metals are located. The bottom coat or layer was made by mixing gamma alumina (23.3%), oxygen storage type material (OSC, $CeO_2$=30%, NdO=7%, and $Pr_6O_{11}$=7%)=69.8%, balance is $ZrO_2$) at about 70%, $ZrO_2$=4.7%, and alumina binder at 2.3%. The bottom layer was coated using a slurry prepared by mixing the alumina in water and milled to a particle size of 90% less than 15 microns. The rest of the components were then added to the slurry and milled further to a particle size of 90% less than 10 microns. The slurry was then coated onto a cylindrical cordierite substrate (d=1.5" and length=2"). The coated substrate was then dried and calcined at 550° C. for 2 h. The calcined weight gain was 1.075 g/in$^3$ made of alumina=0.25 g/in$^3$, OSC=0.75 g/in$^3$, $ZrO_2$=0.05 g/in$^3$ and alumina binder=0.025/g/in$^3$.

The second top layer was made by impregnating Pd (66 g/ft$^3$) onto a standard Diesel Oxidation Catalyst (DOC) support (1.5% $SiO_2/Al_2O_3$). The Pd concentration was about 2.4%. The Pd/support was then made into slurry (42% solid) and milled with alumina binder to a particle size of 90% less than 10 microns. The slurry was then coated over the under coat, dried and calcined at 550° C. for 2 h. The wash coat gain was 1.6 g/in$^3$. The wash coat gain was: PdO=0.0376 g/in$^3$, Pd/SiO2-Al2O3 support=1.55 g/in$^3$, and alumina binder=0.025 g/in$^3$.

Example 2

Catalyst IR-1

This catalyst contained two layers. The bottom (undercoat) layer used the same slurry in reference catalyst of Comparative Example 1 (no precious metal). It was coated onto cordierite substrate, dried and calcined as in Comparative Example 1. The second (top) layer was made by impregnating Pd (66 g/ft$^3$) onto a $CeO_2$—$ZrO_2$—$Al_2O_3$ support. The composition of the support was ($CeO_2$=12.5, $ZrO_2$=12.5, and $Al_2O_3$=75%). The Pd concentration was about 2.1%. The Pd/$CeO_2$—$ZrO_2$—$Al_2O_3$ support was then made into slurry (42% solid) and milled with Ba acetate to a particle size of 90% less than 10 microns. The slurry was then coated over the under coat, dried and calcined at 550° C. for 2 h. The wash coat gain was 1.8 g/in$^3$. The wash coat composition was: PdO=0.0386 g/in$^3$, Pd/Support=1.75 g/in$^3$, and BaO=0.05 g/in$^3$.

Example 3

Catalyst IR-2

This catalyst contained two layers. The bottom (undercoat) layer was same slurry in Comparative Example 1 (no precious metal). It was coated onto cordierite substrate, dried and calcined as in Comparative Example 1. The second (top) layer was made by impregnating Pd (66 g/ft$^3$) onto a $CeO_2$—$ZrO_2$ composite material made of $CeO_2$=45%, $ZrO_2$=45%, NdO=5% and $Pr_6O_{11}$=5% support. The Pd concentration is about 2.3%. The Pd/$CeO_2$—$ZrO_2$ support was then made into slurry (42% solid) and milled with Ba acetate and alumina binder to a particle size of 90% less than 10 microns. The slurry was then coated over the under-coat, dried and calcined at 550° C. for 2 h. The wash coat gain was 1.8 g/in³. The wash coat composition was: PdO=0.0386 g/in³, Pd/Support=1.65 g/in³, alumina binder=0.1 g/in³, and BaO=0.025 g/in³.

Catalyst Aging and Evaluation:

Each catalyst was aged was aged in a tube furnace at 800° C. using 10% steam in air for 12 hours. The catalyst was cooled down and moved into a lab reactor for evaluation.

Each catalyst was evaluated for CO and hydrocarbon light off between 75 and 450° C. The catalysts were heated in air to 75° C. After reaching 75° C., the catalyst were heated at about 10-15° C. up to 450° C. The light-off curves for the three catalysts are shown for the CO and hydrocarbon in FIG. 5 and FIG. 6 respectively. The gas composition used in testing the catalysts were: CO=1500 PPM, NO=100 PPM, hydrocarbon measured as C1=400 PPM ($C_3H_6/C_3H_8$=3/1), $CO_2$=4%, 10% steam, and balance is nitrogen. The figures below show the results of the evaluation.

Figure 5:
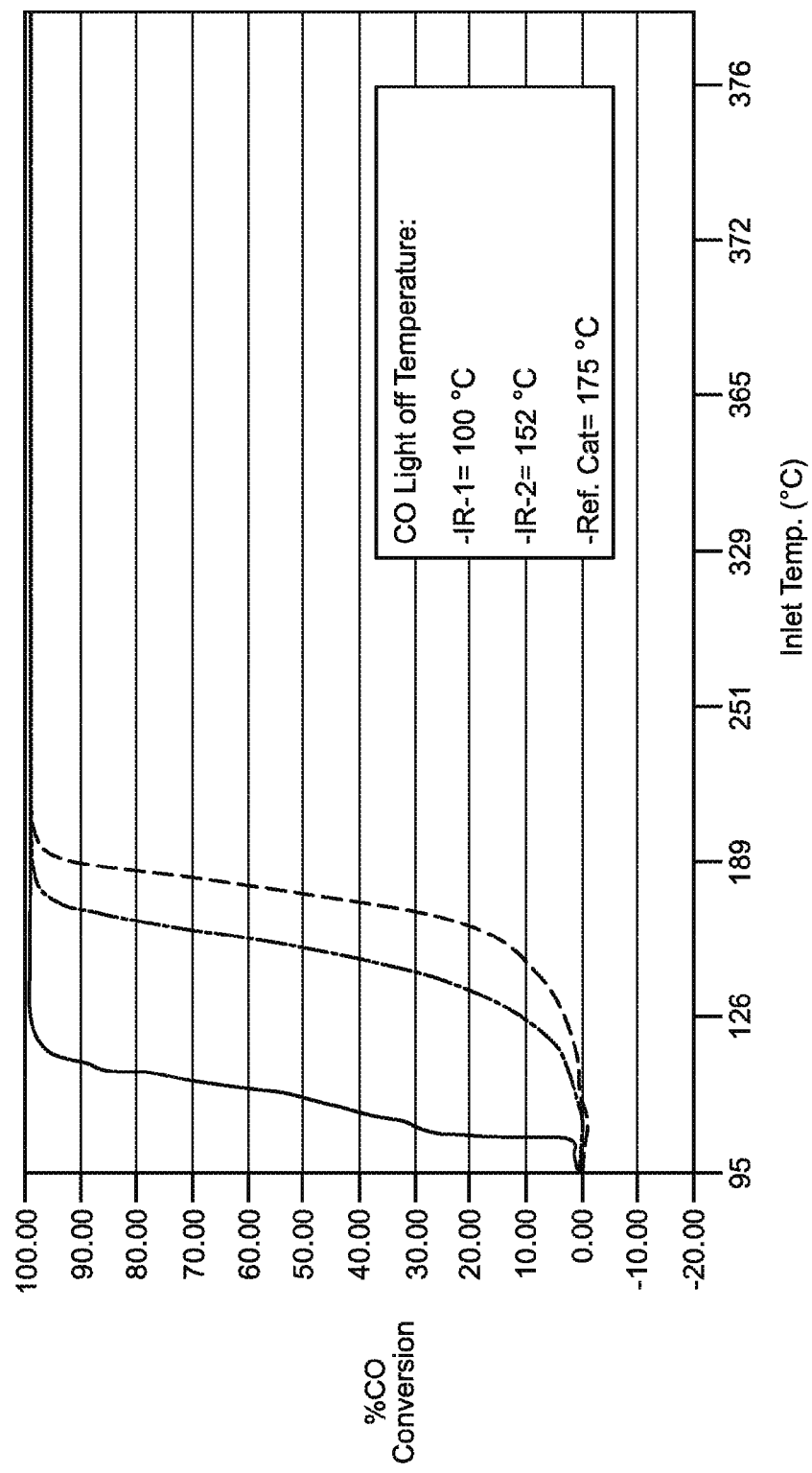
FIG. 5 is a graph showing CO conversion for Examples 1 and 2.
Figure 6:
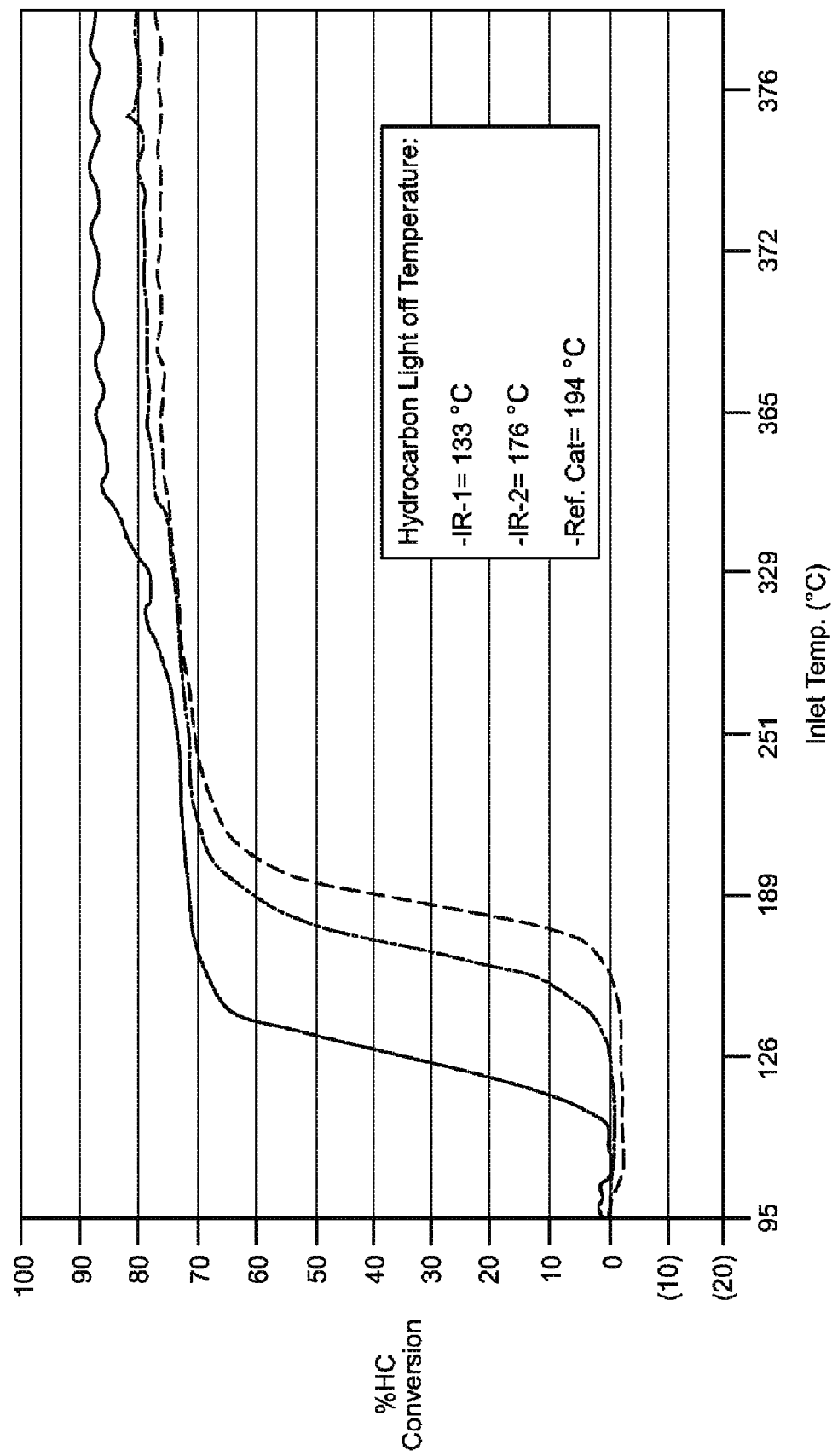
FIG. 6 is a graph showing HC conversion for Examples 1 and 2.

As can be seen in FIG. 5, the catalysts of Example 2 (IR-1) and Example 3 (IR-2) showed about 75 and 25° C. lower light off temperature than the reference (standard) Diesel Oxidation Catalyst (DOC) of Comparative Example 1. CO light off is measured at temperature equivalent to 50% CO conversion. As seen in FIG. 6, the samples of Example 2 and Example 3 showed about 60° and 20° C. lower light off temperature than the reference (standard) Diesel Oxidation Catalyst (DOC). Hydrocarbon light off is measured at temperature equivalent to 50% hydrocarbon conversion.

It is clear from the above that using an OSC ($CeO_2$) in proximity to Pd in Diesel Oxidation catalyst resulted in significant improvement in CO light-off temperature. This is significant because in a diesel vehicle, temperatures remain at low temperatures during light off and during the driving cycle. Therefore, having a catalyst with such low light-off temperature is very favorable for passing the government standards.

Comparative Example 9

This catalyst is made of two layers. The under is made of 1.5% silica on alumina at 1.0 g/in³ and 0.5 g/in³ of Beta zeolite. This under coat layer is free of Pt or Pd. Over the under coat another layer containing Pt and Pd supported on 1.5% silica-alumina at 1.5 g/in³ and contain also Beta zeolite at 0.5 g/in³. The total PM is 110 g/ft3 at a Pt to Pd ratio of 2 to 1.

Examples 4-8

The results above show that using Pd in proximity to materials containing an OSC at loadings of 60 and 90 g/ft³ (Pd or Pt/Pd) had lower light-off temperatures that the standard DOC catalysts (represented by the Comparative Example 1) with significantly higher PM. The Examples below were formulated with a zeolite (specifically a Beta zeolite) for improving hydrocarbon trapping efficiency during cold start. Increasing the Pt in top coat (Example 8) seems to hurt performance. So, mixing Pt/Pd (Example 6) in the same layer clearly showed some benefit over Pt in top coat. It is also recognized that Pt support could be Siralox or any other non $CeO_2$ based material.

TABLE 1

| | |
|---|---|
| Ex. 4. | C: Beta + OSC, MC: Pd(30)/CeZr—Al, TC: Pd(30)/CeZrAl*. |
| Ex. 5. | UC: Beta + OSC, MC: Pd(30)/CeZrAl, TC: Pt(30)/Siralox-1.5% |
| Ex. 6. | UC: Beta + OSC, MC: Pt(15)/Pd(15)CeZrAl, TC Pt(15)/Pd(15) CeZrAl |
| Ex. 7. | UC: Beta + OSC, MC: Pd(30)/CeZrAl, TC: Pt(30)/CeZrAl, 60 g/ft³ |
| Ex. 8. | UC: Beta + OSC, MC: Pd(30)/CZAl, TC: Pt(60)/CZAl, 90 g/ft³      2:1 800/12 h |

*= CeZrAl = 12.5% $CeO_2$-12.5% $ZrO_2$-balance $Al_2O_3$

TABLE 2

| Catalyst | TPM g/ft³ | Pt/Pd Ratio | Aging T. Time, h. | T50 CO | T50 $C_3H_6$ | T50 $C_3H_8$ | T50 $CH_4$ |
|---|---|---|---|---|---|---|---|
| Com. 9': | 110 | 2:1 | 800 C./12 h | 195 | 196 | 352 | 432 |
| Ex. 4: | 60 | 0:1 | 800/12 h | 141 | 149 | 305 | 356 |
| Ex. 5: | 60 | 1:1 | 800/12 h | 146 | 157 | 359 | >450 |
| Ex. 6: | 60 | 1:1 | 800/12 h | 137 | 152 | 400 | >450 |
| Ex. 7: | 60 | 1:1 | 800/12 h | 139 | 158 | 344 | >400 |
| Ex. 8: | 90 | 2:1 | 800/12 h | 152 | 163 | 348 | >401 |

The results from Examples 6, 7, & 8 showed significantly lower light off temperatures than reference catalysts in spite that these examples have lower Total Precious Metal. Regarding Example 8, the light off temperatures were higher than other samples, which may be due to the higher Pt:Pd ratio.

Examples 9, 10 and 11

To demonstrate a catalyst exhibiting improved combustion of trapped hydrocarbon, Beta zeolite was added to the top Pt coat.

TABLE 3

| Catalyst |
|---|
| Ex. 10: UC: CeZrAl, MC: Pd/Ce—Zr—Al, TC: Pt/CeZrAl + Beta, PM = 60 |
| Ex. 11: UC: Ce—Zr—Al, MC: Pd/Ce—Zr—Al, TC: Pt/CeZrAl + Beta, PM = 90 |
| Ex. 12: UC: Ce—Zr—Al, MC: Pd/Ce—Zr—Al, TC: Pt/Pd/CeZrAl + Beta, PM = 90 |

Evaluation Results for Examples 10, 11 and 12

TABLE 4

| | | | Catalyst | | | | |
|---|---|---|---|---|---|---|---|
| Ex. 10 | 60 | 1:1 | 800/12 h | 132 | 146 | 358 | >450 |
| Ex. 11 | 90 | 2:1 | 800/12 h | 160 | 165 | 326 | >450 |
| Ex. 12 | 90 | 1:1 | 800/12 h | 126 | 139 | 342 | >450 |

The results from Examples 9, 10, and 11 show low light off temperatures, except for Example 10, which may be due to the Pt:Pd ratio.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An oxidation catalyst for abatement of exhaust gas emissions from an engine comprising:
    a carrier substrate;
    an undercoat coated on the carrier substrate, the undercoat comprising a refractory metal oxide support; and
    a first washcoat layer comprising a support material selected from ceria-zirconia and ceria-zirconia-alumina and a precious metal catalyst containing palladium (Pd), wherein said first washcoat layer does not contain a zeolite.

2. The oxidation catalyst of claim 1, wherein the refractory metal oxide comprises alumina, ceria, zirconia, ceria-alumina, ceria-zirconia, ceria-zirconia-alumina, and mixtures thereof.

3. The oxidation catalyst of claim 2, wherein the refractory metal oxide further comprises one or more promoters selected from oxides of lanthanum, yttrium, neodymium, praseodymium, samarium, and strontium.

4. The oxidation catalyst of claim 1, wherein the undercoat further comprises a hydrocarbon storage component comprising a molecular sieve.

5. The oxidation catalyst of claim 4, wherein the molecular sieve is selected from a beta zeolite, a molecular sieve having a CHA structure, X zeolite, Y zeolite, silicoaluminophosphates, and pentasil.

6. The oxidation catalyst of claim 1, wherein the first washcoat layer contains substantially no platinum.

7. The oxidation catalyst of claim 1, further comprising a second washcoat layer coated over said first washcoat layer comprising a support material and a precious metal catalyst containing one or more of platinum (Pt) and palladium (Pd), and at least one of the undercoat or the second washcoat layer comprises one or more hydrocarbon storage components.

8. The oxidation catalyst of claim 7, wherein the undercoat comprises a hydrocarbon storage component comprising a molecular sieve.

9. The oxidation catalyst of claim 8, wherein the molecular sieve is selected from faujasite, chabazite, clinoptilolite, mordenite, silicalite, zeolite X, zeolite Y, ultrastable zeolite Y, ZSM zeolite, offretite, and beta zeolite.

10. The oxidation catalyst of claim 8, wherein the molecular sieve comprises beta zeolite.

11. The oxidation catalyst of claim 7, wherein said second washcoat layer contains platinum and palladium in a Pt:Pd ratio in the range of about 1:1 to 10:1.

12. The oxidation catalyst of claim 7, wherein said second washcoat layer contains platinum and palladium in a Pt:Pd ratio in the range of about 1:1 to 2:1.

13. The oxidation catalyst of claim 7, wherein the first washcoat layer is substantially silica free.

14. The oxidation catalyst of claim 7, wherein one or more of the undercoat and second washcoat layer further comprises a ceria-zirconia material.

15. The oxidation catalyst of claim 7, wherein the second washcoat layer comprises a molecular sieve.

16. The oxidation catalyst of claim 15, wherein the molecular sieve comprises beta zeolite.

17. The oxidation catalyst of claim 13, wherein the second washcoat layer comprises one or more of alumina and silica-alumina.

18. The oxidation catalyst of claim 1, wherein the substrate comprises a honeycomb substrate comprising substantially parallel gas flow passages extending from an inlet or an outlet face of the substrate defined by walls on which the washcoat layers are coated so that gases flowing through the passages contact material contained in the layers.

19. The oxidation catalyst of claim 7, wherein the substrate comprises a honeycomb substrate comprising substantially parallel gas flow passages extending from an inlet or an outlet face of the substrate defined by walls on which the washcoat layers are coated so that gases flowing through the passages contact material contained in the layers.

20. A method for treating a diesel exhaust gas stream comprising:
    contacting the exhaust gas stream with a top layer catalyst coated over a first catalyst layer, the top layer catalyst comprising a support material, one or more hydrocarbon storage components, and a precious metal catalyst containing one or more of platinum (Pt) and palladium (Pd); and
    after contacting the exhaust gas stream with the top layer catalyst, contacting the exhaust gas stream with a first catalyst layer comprising a support material selected from ceria-zirconia and ceria-zirconia-alumina and a precious metal catalyst containing palladium (Pd) and substantially no platinum, wherein said first catalyst layer does not contain a zeolite.

21. The method of claim 20, wherein the hydrocarbon storage component comprises a zeolite.

22. The method of claim 21, wherein the zeolite is selected from faujasite, chabazite, clinoptilolite, mordenite, silicalite, zeolite X, zeolite Y, ultrastable zeolite Y, ZSM zeolite, offretite, and beta zeolite.

23. The method of claim 22, wherein the zeolite comprises beta zeolite.

24. The method of claim 23, wherein the top washcoat layer contains platinum and palladium in a Pt:Pd ratio in the range of about 1:1 to 2:1.

25. The method of claim 24, wherein said diesel exhaust gas stream subsequent to contacting said oxidation catalyst is directed to a catalyzed soot filter (CSF) located downstream of said diesel oxidation catalyst.

26. The method of claim 25, wherein said diesel exhaust gas stream subsequent to contacting said catalyzed soot filter (CSF) is directed to a selective catalytic reduction (SCR) component located downstream of said catalyzed soot filter (CSF).

* * * * *